United States Patent
Al-Hannabi et al.

(10) Patent No.: US 11,340,132 B2
(45) Date of Patent: *May 24, 2022

(54) DUAL SLIDER MECHANISM

(71) Applicant: Saudi Arabian Oil Company, Dhahran (SA)

(72) Inventors: Abdoulelah Al-Hannabi, Thuwal (SA); Mohamed Abdelkader, Thuwal (SA); Hassane Trigui, Thuwal (SA); Sahejad Patel, Thuwal (SA); FadL Abdellatif, Thuwal (SA)

(73) Assignee: Saudi Arabian Oil Company, Dhahran (SA)

( * ) Notice: Subject to any disclaimer, the term of this patent is extended or adjusted under 35 U.S.C. 154(b) by 343 days.

This patent is subject to a terminal disclaimer.

(21) Appl. No.: 16/670,626

(22) Filed: Oct. 31, 2019

(65) Prior Publication Data

US 2021/0080337 A1 Mar. 18, 2021

Related U.S. Application Data

(63) Continuation-in-part of application No. 16/574,642, filed on Sep. 18, 2019, now Pat. No. 11,047,179.

(51) Int. Cl.
 *G01M 3/00* (2006.01)
(52) U.S. Cl.
 CPC .................... *G01M 3/005* (2013.01)
(58) Field of Classification Search
 CPC ..... G01M 3/005; G01M 5/0025; F16L 55/40; F16L 55/44
 See application file for complete search history.

(56) References Cited

U.S. PATENT DOCUMENTS

| 4,510,447 A * | 4/1985 | Moyer .................. G01N 27/83 324/225 |
| 6,107,795 A | 8/2000 | Smart |
| 7,131,344 B2 | 11/2006 | Tarumi |
| 8,308,211 B2 | 11/2012 | Chevassu et al. |
| 8,390,278 B2 | 3/2013 | Petrosky |
| 9,933,329 B2 | 4/2018 | Hansen et al. |
| 9,982,830 B2 | 5/2018 | Kwon et al. |
| 10,092,698 B2 | 10/2018 | Park et al. |

FOREIGN PATENT DOCUMENTS

| CN | 100586361 C | 2/2010 |
| CN | 207086931 U | 3/2018 |
| JP | 2566236 | 10/1988 |
| JP | 2643492 | 7/1991 |
| JP | 6087857 | 6/1993 |

* cited by examiner

*Primary Examiner* — Erika J. Villaluna
(74) *Attorney, Agent, or Firm* — Leason Ellis LLP

(57) ABSTRACT

An apparatus for automated inspection or maintenance is provided. The apparatus includes a dual slider mechanism for deploying a probe. The dual slider mechanism comprises: a frame; a probe slider configured to attach the probe; a probe linear guide coupled to the frame and configured to guide the probe slider and attached probe in a linear direction; a spring having one end attached to the probe slider; a spring slider attached to another end of the spring; and a spring linear guide coupled to the frame and configured to guide the spring slider and attached spring in the linear direction, in order to guide the probe slider and attached probe in the linear direction along the probe linear guide using the guided spring.

18 Claims, 13 Drawing Sheets

DUAL SLIDER MECHANISM

CROSS-REFERENCE TO RELATED APPLICATION

This application is a continuation-in-part and claims the benefit of U.S. patent application Ser. No. 16/574,642, filed Sep. 18, 2019 and titled IN-PIPE PASSIVE CENTERING MECHANISM WITH RADIAL PROBE OR TOOL DEPLOYMENT MECHANISM, the entire content of which is herein incorporated by reference.

FIELD OF THE DISCLOSURE

The present disclosure relates to pipeline sensing and maintenance in general, and, more specifically, to a pipeline apparatus having an in-pipe passive centering mechanism with a radial probe or tool deployment mechanism.

In addition, the present disclosure relates to automated probe and tool deployment in general, and, more specifically, to a dual slider mechanism for automated probe or tool deployment.

BACKGROUND OF THE DISCLOSURE

In the field of automated pipeline technology, in-pipe inspections and maintenance can be challenging tasks as they can require certain functions to be executed in a limited space using remotely operated or autonomous robots and crawlers. Crawlers equipped with sensory features and maintenance tools drive inside the pipe and perform certain tasks at specific locations. It can be important to ensure proper deployment of sensor probes and tool heads to achieve reliable output. In-pipe tasks often require perpendicular deployment of probes and tools with respect to the inner walls of the pipeline in order to achieve consistent data and results. However, this can be difficult to reliably achieve with robotic systems given the different pipe schedules (e.g., different internal diameters), the various sizes of pipes, and the negotiation of interior obstacles such as going through weld beads.

It is in regard to these and other problems in the art that the present disclosure is directed to provide a technical solution for an effective pipeline apparatus having an in-pipe passive centering mechanism with a radial probe or tool deployment mechanism.

In addition, in the field of automated probe and tool deployment technology, inspections and maintenance can be challenging tasks as they can require certain functions to be executed in a limited access space (such as a difficult to access space) using remotely operated or autonomous robots and crawlers. Crawlers, robotic arms, and similar automated deployment devices equipped with sensory features and maintenance tools drive in and about assets such as pipes, tanks, vessels, structures, columns, and the like, to perform tasks such as inspections and maintenance. These inspections and maintenance functions may need to be performed, for example, at specific locations in or on the assets.

It can be important to ensure proper deployment of sensor probes and tool heads to achieve reliable output. Inspection and maintenance tasks often require perpendicular (or other fixed angle) deployment of probes and tools with respect to a deployment surface (e.g., wall, shell, lining, skin, to name a few), such as to achieve consistent data and results. In addition, inspection and maintenance tasks often require probes and tools (such as measurement probes) to be deployed with a certain push force for proper deployment. However, this can be difficult to reliably achieve with automated or robotic systems given the different dimensions of the target surfaces and various sizes of the assets being inspected or maintained.

It is also in regard to these and other problems in the art that the present disclosure is directed to provide a technical solution for an effective automated probe or tool deployment apparatus having a dual slider mechanism for automated probe or tool deployment.

SUMMARY OF THE DISCLOSURE

According to an embodiment, an in-pipe apparatus to inspect or maintain a pipe is provided. The apparatus includes: a rotational deployment mechanism to rotationally deploy a probe or tool about an inner circumference of the pipe with respect to an axis of rotation; a radial deployment mechanism to radially deploy the probe or tool in a radial direction from the axis of rotation toward a target point on the inner circumference of the pipe; and a passive centering mechanism to passively align the axis of rotation with the axis of the pipe.

In an embodiment, the apparatus further includes a longitudinal deployment mechanism to longitudinally deploy the probe or tool in a longitudinal direction along the axis of the pipe.

In an embodiment, a diameter of the pipe varies in the longitudinal direction, and the passive centering mechanism passively maintains alignment of the axis of rotation with the axis of the pipe across the varying pipe diameter during the longitudinal deployment of the probe or tool.

In an embodiment, the rotational deployment mechanism includes a motor to rotate the radial deployment mechanism about the axis of rotation.

In an embodiment, the target point includes a plurality of target points on the inner circumference of the pipe at a corresponding plurality of radial directions from the axis of rotation, and the rotational deployment mechanism is further to rotationally deploy the probe or tool to each of the radial directions while the passive centering mechanism passively maintains alignment of the axis of rotation with the axis of the pipe and the radial deployment mechanism radially deploys the probe or tool toward a corresponding one of the target points.

In an embodiment, the radial deployment mechanism includes: a first slider to hold the probe or tool; a first linear guide to linearly guide the first slider in the radial direction; and a linear actuator to linearly actuate the first slider along the first linear guide, to radially deploy the probe or tool in the radial direction.

In an embodiment, the radial deployment mechanism further includes: a spring held by the first slider at a first point of attachment; a second slider to hold the spring at a second point of attachment; and a second linear guide to linearly guide the second slider in the radial direction, wherein the linear actuator is further to linearly actuate the second slider along the second linear guide, to radially deploy the probe or tool in the radial direction until the probe or tool touches the target point and the spring exerts a desired amount of force on the probe or tool in the radial direction against the target point.

In an embodiment, the linear actuator directly linearly actuates the second slider along the second linear guide, and the linear actuator indirectly linearly actuates the first slider along the first linear guide through compression or tension in the spring.

In an embodiment, the passive centering mechanism includes legs and a spring, the legs are configured to make at least three points of contact with an inside wall of the pipe, and the spring is configured to exert outward force on the legs and against the inside wall of the pipe sufficient to passively align the axis of rotation with the axis of the pipe.

In an embodiment, the legs include wheels to longitudinally deploy the probe or tool in a longitudinal direction along the axis of the pipe, a diameter of the pipe varies in the longitudinal direction, and the outward force exerted by the spring is further sufficient to passively maintain alignment of the axis of rotation with the axis of the pipe across the varying pipe diameter during the longitudinal deployment of the probe or tool.

According to another embodiment, a method of in-pipe inspection or maintenance of a pipe is provided. The method includes: automatically rotationally deploying a probe or tool about an inner circumference of the pipe with respect to an axis of rotation; radially deploying, using a radial deployment mechanism, the probe or tool in a radial direction from the axis of rotation toward a target point on the inner circumference of the pipe; and passively aligning the axis of rotation with the axis of the pipe.

In an embodiment, the method further includes automatically longitudinally deploying the probe or tool in a longitudinal direction along the axis of the pipe.

In an embodiment, a diameter of the pipe varies in the longitudinal direction, and passively aligning the axis of rotation includes passively maintaining alignment of the axis of rotation with the axis of the pipe across the varying pipe diameter during the longitudinal deployment of the probe or tool.

In an embodiment, rotationally deploying the probe or tool includes rotating the radial deployment mechanism about the axis of rotation using a motor.

In an embodiment, the target point includes a plurality of target points on the inner circumference of the pipe at a corresponding plurality of radial directions from the axis of rotation, and rotationally deploying the probe or tool further includes rotationally deploying the probe or tool to each of the radial directions while passively maintaining alignment of the axis of rotation with the axis of the pipe and the radial deployment mechanism radially deploys the probe or tool toward a corresponding one of the target points.

In an embodiment, radially deploying the probe or tool includes: holding the probe or tool with a first slider; and linearly actuating the first slider in the radial direction along a first linear guide.

In an embodiment, radially deploying the probe or tool further includes: holding a spring with the first slider and with a second slider; and linearly actuating the second slider in the radial direction along a second linear guide until the probe or tool touches the target point and the spring exerts a desired amount of force on the probe or tool in the radial direction against the target point.

In an embodiment, actuating the first and second sliders includes: directly linearly actuating the second slider along the second linear guide, and indirectly linearly actuating the first slider along the first linear guide through compression or tension in the spring.

In an embodiment, passively aligning the axis of rotation includes: making at least three points of contact with legs against an inside wall of the pipe, and exerting outward force with a spring on the legs and against the inside wall of the pipe sufficient to passively align the axis of rotation with the axis of the pipe.

In an embodiment, the method further includes automatically longitudinally deploying the probe or tool in a longitudinal direction along the axis of the pipe using wheels that are part of the legs, wherein a diameter of the pipe varies in the longitudinal direction, and exerting the outward force with the spring is further sufficient to passively maintain alignment of the axis of rotation with the axis of the pipe across the varying pipe diameter during the longitudinal deployment of the probe or tool.

According to yet another embodiment, an apparatus for automated inspection or maintenance is provided. The apparatus includes a dual slider mechanism for deploying a probe or tool. The dual slider mechanism includes: a frame; a probe or tool slider configured to attach to the probe or tool; a probe or tool linear guide coupled to the frame and configured to guide the probe or tool slider and attached probe or tool in a linear direction; a spring having one end attached to the probe or tool slider; a spring slider attached to another end of the spring; and a spring linear guide coupled to the frame and configured to guide the spring slider and attached spring in the linear direction, in order to guide the probe or tool slider and attached probe or tool in the linear direction along the probe or tool linear guide using the guided spring.

In an embodiment, the dual slider mechanism further includes a linear actuator coupled to the frame and configured to actuate the spring slider and attached spring in the linear direction along the spring linear guide, in order to actuate the probe or tool slider and attached probe or tool in the linear direction along the probe or tool linear guide using the actuated spring.

In an embodiment, after actuating the probe or tool slider and attached probe or tool until the actuated probe or tool contacts a target surface, the linear actuator is further configured to further actuate the spring slider and attached spring in the linear direction along the spring linear guide, in order to transfer force of the further actuated spring to the probe or tool against the target surface.

In an embodiment, the apparatus further includes a motor coupled to the frame and configured to rotate the dual slider mechanism about a rotation axis.

In an embodiment, the linear direction is perpendicular to the rotation axis.

In an embodiment, the apparatus further includes a robotic arm coupled to the frame and configured to deploy the dual slider mechanism to point toward a target surface.

In an embodiment, the robotic arm includes a linear actuator coupled to the frame and configured to actuate the spring slider and attached spring in the linear direction along the spring linear guide, in order to actuate the probe or tool slider and attached probe or tool in the linear direction toward the target surface along the probe or tool linear guide using the actuated spring.

In an embodiment, after actuating the probe or tool slider and attached probe or tool in the linear direction until the actuated probe or tool contacts the target surface, the linear actuator is further configured to further actuate the spring slider and attached spring in the linear direction along the spring linear guide, in order to transfer force of the further actuated spring to the probe or tool against the target surface.

In an embodiment, the probe includes a sensor, a tool, or both a sensor and a tool.

According to still yet another embodiment, a method of automated inspection or maintenance using a dual slider mechanism for deploying a probe or tool is provided. The method includes: attaching the probe or tool to a probe or tool slider of the dual slider mechanism; and guiding the probe or tool slider and attached probe or tool in a linear direction along a probe or tool linear guide of the dual slider mechanism, the probe or tool linear guide being coupled to a frame of the dual slider mechanism. Guiding the probe or tool slider and attached probe or tool includes: attaching one end of a spring of the dual slider mechanism to the probe or tool slider and another end of the spring to a spring slider of the dual slider mechanism; guiding the spring slider and attached spring in the linear direction along a spring linear guide of the dual slider mechanism, the spring linear guide being coupled to the frame; and guiding the probe or tool slider and attached probe or tool in the linear direction along the probe or tool linear guide using the guided spring.

In an embodiment: guiding the spring slider and attached spring includes actuating, using a linear actuator of the dual slider mechanism, the spring slider and attached spring in the linear direction along the spring linear guide, the linear actuator being coupled to the frame; and guiding the probe or tool slider and attached probe or tool using the guided spring includes actuating the probe or tool slider and attached probe or tool in the linear direction along the probe or tool linear guide using the actuated spring.

In an embodiment: actuating the probe or tool slider and attached probe or tool includes actuating the probe or tool slider and attached probe or tool until the actuated probe or tool contacts a target surface; and the method further includes: after the actuated probe or tool contacts the target surface, further actuating the spring slider and attached spring in the linear direction along the spring linear guide using the linear actuator; and transferring force of the further actuated spring to the probe or tool against the target surface.

In an embodiment, the method further includes rotating the dual slider mechanism about a rotation axis using a motor coupled to the frame.

In an embodiment, the linear direction is perpendicular to the rotation axis.

In an embodiment, the method further includes deploying the dual slider mechanism to point toward a target surface using a robotic arm coupled to the frame.

In an embodiment: guiding the spring slider and attached spring includes actuating, using a linear actuator of the robotic arm, the spring slider and attached spring in the linear direction along the spring linear guide, the linear actuator being coupled to the frame; and guiding the probe or tool slider and attached probe or tool using the guided spring includes actuating the probe or tool slider and attached probe or tool in the linear direction toward the target surface along the probe or tool linear guide using the actuated spring.

In an embodiment: actuating the probe or tool slider and attached probe or tool includes actuating the probe or tool slider and attached probe or tool until the actuated probe or tool contacts the target surface; and the method further includes: after the actuated probe or tool contacts the target surface, further actuating the spring slider and attached spring in the linear direction along the spring linear guide using the linear actuator; and transferring force of the further actuated spring to the probe or tool against the target surface.

In an embodiment, the probe includes a sensor, a tool, or both a sensor and a tool.

Any combinations of the various embodiments and implementations disclosed herein can be used. These and other aspects and features can be appreciated from the following description of certain embodiments and the accompanying drawings and claims.

Figure 1:
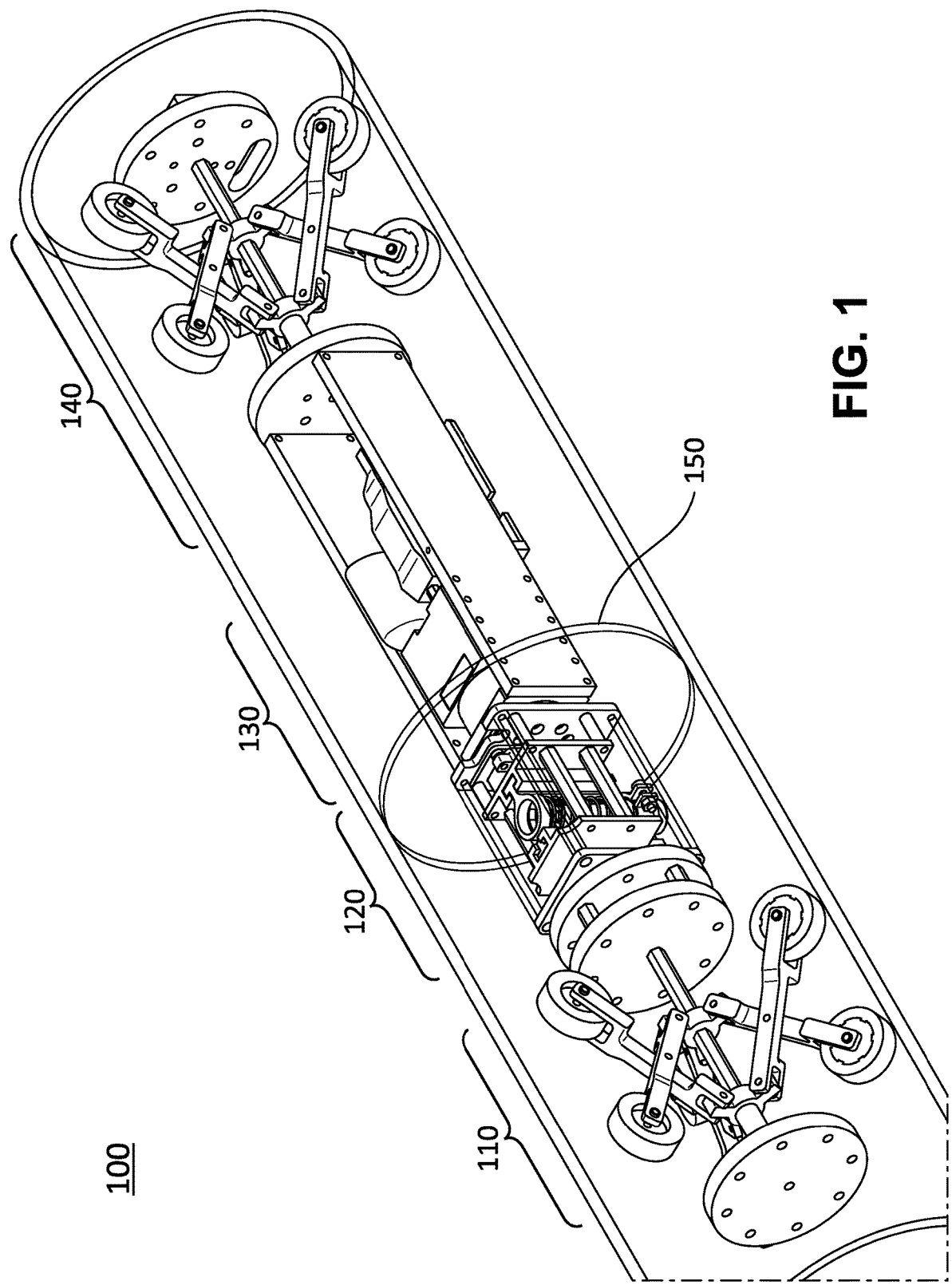
FIG. 1 is an oblique cutaway view of an example pipeline apparatus having an in-pipe passive centering mechanism with a radial deployment mechanism for a probe or tool, according to an embodiment.

It is noted that the drawings are illustrative and not necessarily to scale.

DETAILED DESCRIPTION OF CERTAIN EMBODIMENTS OF THE DISCLOSURE

Example embodiments of the present disclosure are directed to an automated pipeline apparatus having an in-pipe passive centering mechanism with a radial probe or tool deployment mechanism. In one such embodiment, simple and efficient mechanisms to center and actuate the probe or tool inside a small diameter pipe are provided. This technique has less complexity than comparable automated approaches. In this technique, the probe or tool is deployed radially (e.g., towards the pipe inner wall) by attaching the probe or tool to a linear guide coupled with a spring that is actuated by a linear actuator. Further, the radial deployment mechanism is supported by a rotational deployment mechanism whose axis of rotation coincides with the axis of the pipe (e.g., line going through the center of the pipe) by a passively adaptable centering mechanism using another spring. Together, the rotational deployment, radial deployment, and centering mechanisms make sure that the probe or tool is deployed properly (e.g., perpendicular to the tangent line of the pipe inside wall), even for varying pipe sizes. The three mechanisms also ensure proper measurement and deployment around the internal circumference of the pipe. Furthermore, when the linear actuator extends radially, the probe or tool deploys until it touches the inside of the pipe, and the spring absorbs any additional load experienced by the probe or tool while ensuring reliable deployment.

As discussed earlier, in-pipe inspection and maintenance can be a rigorous task as it can require certain functions to be executed in a limited space using remotely operated or autonomous robots or crawlers. Compounding these challenges includes the need for proper deployment of the probes and tool heads to achieve desired output. Other ways of addressing these concerns can rely on manual deployment of the probe or tool, or manual centering of the probe or tool (e.g., to a specific pipe schedule), or actuated centering support, where a pneumatic actuator performs the centering. These approaches require manual intervention (and loss of accuracy) or more operating components and complexity compared to automated techniques disclosed herein.

Accordingly, in an example embodiment, a pipeline apparatus having a rotation motor and a linear actuator to deploy probes and tools is provided. The pipeline apparatus uses a passively adaptable centering mechanism to center the axis of rotation of the rotation motor with the axis of the pipe. This ensures the linear actuator radially deploys the probe or tool consistently (e.g., perpendicularly including substantially perpendicular within a few degrees of 90 degrees) to any point on the inside surface of the pipe, and without using any active centering (such as with a motor, or with a guided electrical or pneumatic system, or by a manual procedure). Here, perpendicular is with respect to a tangent line going through a target point on an inside of the pipe, plus or minus a few degrees, for instance, perpendicular can include 85 to 95 degrees. The pipeline apparatus thus combines a centering mechanism and a radial probe or tool deployment mechanism. The radial probe or tool deployment mechanism uses a spring for reliable probe and tool deployment. The radial probe or tool deployment mechanism also uses a linear guide and an actuator to radially actuate the probe or tool. In addition, the pipeline apparatus aligns the axis of rotation of a rotation motor to the pipe axis to ensure reliable deployment of the probe or tool.

Throughout, a dry film thickness (DFT) probe is used and illustrated as an example probe or tool for use with some embodiments. Such a digital coating thickness gauge can use magnetic and eddy current principles to measure the coating thickness on ferrous and non-ferrous metals using a probe. However, this probe should be deployed perpendicularly on the surface of interest to take a reliable measurement, within the range of "perpendicular" noted previously. While the DFT probe is used throughout for convenience of description, other embodiments are not so limited. For example, in some embodiments, other probes (such as an ultrasonic thickness probe) or tools serve as example probes or tools for in-pipe passive centering and radial deployment. Such pipeline apparatuses are able to take reliable readings (or reliably deploy tools) in different pipe schedules, with the probe or tool being rotationally deployed in conjunction with a centering mechanism such that the probe or tool can be rotated evenly distanced from the pipe wall. Changing pipe schedules or sizes causes a passive re-centering of the apparatus such that the probe or tool still rotates at an even distance (spacing) from the pipe wall. As such, the centering mechanism ensures that the probe or tool holder is centered and deploys properly in all applicable sizes of pipe.

In an embodiment, an automated pipeline apparatus employs several mechanical systems, including a rotation mechanism for rotational deployment of a probe or tool within a pipe, a centering mechanism to center the rotation mechanism passively inside the pipe (e.g., with respect to the pipe axis, such as aligning the axis of rotation of the rotation mechanism with the pipe axis), a radial deployment mechanism for radially deploying the probe or tool onto the pipe wall to take the measurement or perform the tool operation, and a longitudinal deployment mechanism (e.g., wheels and a motor) to move the probe or tool longitudinally along the inside of the pipe. The centering mechanism further maintains the centering (e.g., alignment of the axis of rotation of the rotation mechanism with the pipe axis) during the longitudinal deployment, even when the inside pipe diameter changes or varies in the longitudinal direction.

FIG. 1 is an oblique cutaway view of an example pipeline apparatus 100 having an in-pipe passive centering mechanism 110 with a radial probe or tool deployment mechanism 120, according to an embodiment. The pipeline apparatus 100 further includes a rotational deployment mechanism 130 (e.g., a servo motor) and a longitudinal deployment mechanism 140 (e.g., including another passive centering mechanism, or part of the existing passive centering mechanism).

In further detail, the passive centering mechanism 110 is illustrated as a tri-wheel (three sets of wheels) configuration, each wheel set offset 120° from the other wheel sets in the rotational dimension of the inside pipe. Equal outward force against the inside wall of the pipe is exerted by each of the wheel sets, to center the apparatus 100 regardless of pipe diameter. The wheel sets also permit movement of the apparatus in the longitudinal dimension. Since the centering mechanism 110 is passive, there are no motors or guided (or manual) steps involved in the centering. Instead, simple mechanical forces are used for the centering, such as springs, as illustrated in the embodiments illustrated and discussed below in connection with FIGS. 2A, 2B, 3, 4 and the further embodiment in FIG. 7.

The radial deployment mechanism 120 deploys a probe or tool in the radial dimension inside the pipe. As such, the radial deployment mechanism 120 includes, in one embodiment, a linear actuator to deploy the probe or tool in a radial direction (e.g., from the axis of the pipe to a target point on a deployment circumference 150 of the inner pipe). The radial deployment of the probe or tool is perpendicular to the target point on the deployment circumference 150 (such as perpendicular to a tangent line of the deployment circumference 150 at the target point). Further details are described in connection with FIGS. 5 and 6 below.

The rotational deployment mechanism 130 rotationally deploys the probe or tool about an axis of rotation that is aligned to the pipe axis by the passive centering mechanism 110. For example, the rotational deployment mechanism 130 can be a servo motor coupled to the radial deployment mechanism 120 and that rotates the radial deployment mechanism 120 about the pipe axis to reach the desired amount of rotation (while tracing the deployment circumference 150 of the probe or tool in the process).

The longitudinal deployment mechanism 140 (such as a motor and wheels) moves the apparatus 100, including the probe or tool, longitudinally along the inside of the pipe (in the direction of the pipe axis, or in the longitudinal dimension). The longitudinal deployment mechanism 140 can adjust the deployment circumference 150 of the probe or tool through this longitudinal deployment or movement. For example, in an embodiment, the longitudinal deployment mechanism includes a motor to rotate one or more axles that drive a corresponding one or more sets of wheels (along with the rest of the apparatus 100) in the longitudinal direction. As an example, the longitudinal movement of the apparatus 100 can be for a set or predetermined distance, or to a set or predetermined location, or the like. Together, the longitudinal deployment mechanism 140 in combination with the radial deployment mechanism 120 and rotational deployment mechanism 130 (as centered or aligned by the passive centering mechanism 110) can allow the probe or tool to deploy consistently (e.g., perpendicularly) and reliably to any point on the inside of the pipe.

Figure 2A:
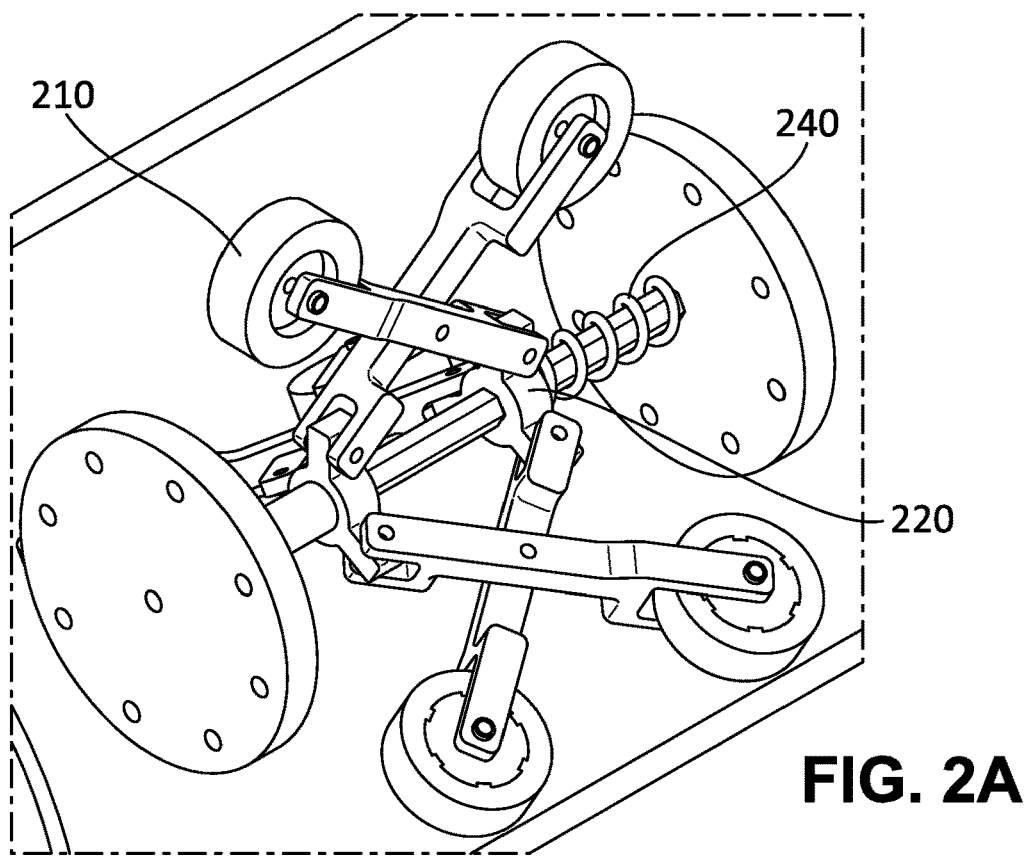
FIGS. 2A-2B are oblique cutaway views in different size pipes of an example in-pipe passive centering mechanism, such as for use with the pipeline apparatus of FIG. 1, according to an embodiment.
Figure 2B:
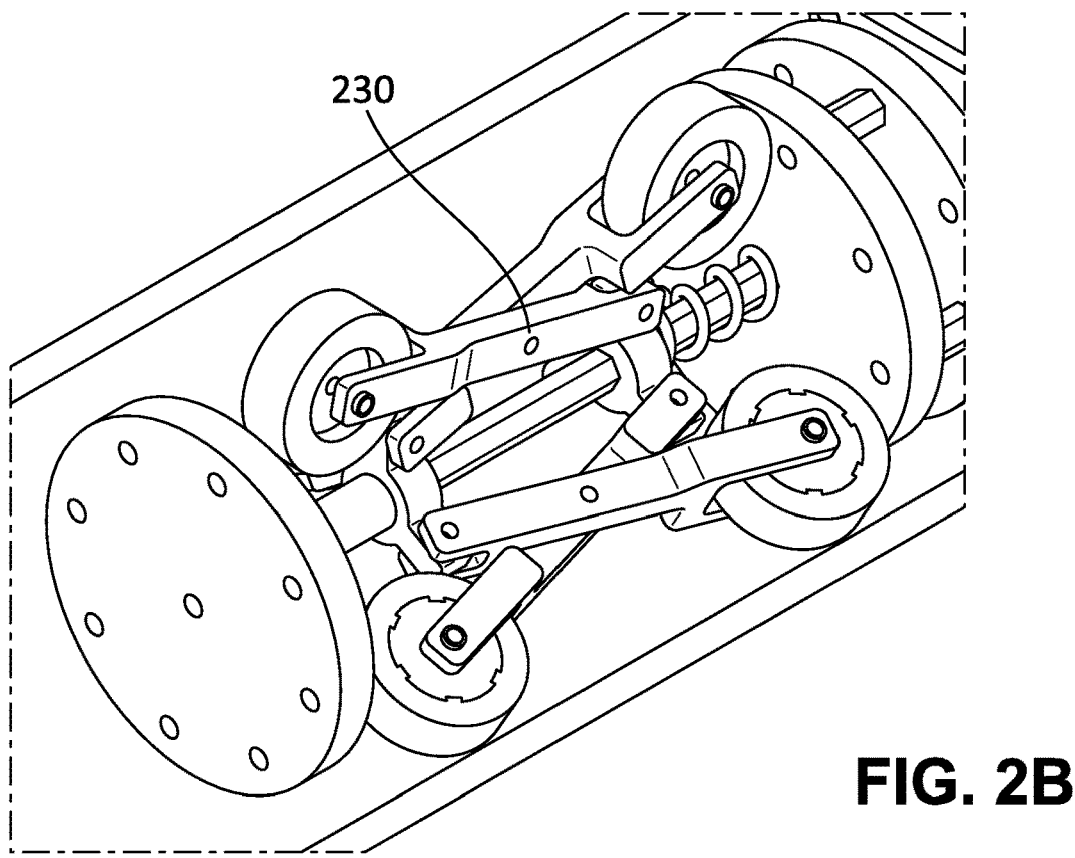

FIGS. 2A-2B are oblique cutaway views in different size pipes of an example in-pipe passive centering mechanism, such as the passive centering mechanism 110 for use with the pipeline apparatus 100 of FIG. 1, according to an embodiment. The passive centering mechanism includes wheels 210 arranged in three sets of two wheels apiece (six wheels total), each wheel set being offset 120° from each other about the pipe axis. The wheels 210 are connected by supports or legs (one wheel per leg, six legs total) to two sliding rings 220 (three wheels per sliding ring, one from each wheel set) along an axle aligned with the axis of the pipe.

The two legs (or supports) of each wheel set are further connected to each other at a pivot point 230 to allow the wheel set to expand or contract in order to adjust to the inside pipe diameter. FIG. 2A illustrates the wheel sets expanded for a large diameter pipe while FIG. 2B illustrates the wheel sets contracted for a small diameter pipe. A compression spring 240 exerts inward longitudinal force on the sliding ring 220 to expand the wheel sets to fit the inside diameter of the pipe. Put another way, the sliding rings 220, legs, and pivot points 230 convert the inward longitudinal force of the compression spring 240 to an outward force on each of the wheels 210 against the inside wall of the pipe. This passively centers or aligns the axle of the centering mechanism with the pipe axis, regardless of the pipe diameter or schedule. Strictly speaking, the passive centering mechanism is constrained to a certain minimum size and a certain maximum size, but that range is adjustable depending on factors such as length of the legs, location of the pivot points 230, strength of the compression spring 240, and the like. As such, for ease of description, the range is treated as unbounded.

Before inserting the centering mechanism inside a pipe, the compression spring 240 keeps the two wheels 210 of each wheel set at the maximum extended position, which needs to be larger than the maximum inner pipe diameter for which passive centering is to be accomplished. Once the centering mechanism is inserted inside the pipe, all the supporting links (or legs) push together the sliding rings 220. This ensures the centricity of the shaft and module. Hence, the sliding rings 220 compress the spring 240 and this compression provides the required force to keep the wheels 210 attached to the pipe walls and to keep the module centered. It should be noted that in some embodiments, the spring 240 itself can be tuned to control the force delivered, such as using a stronger or weaker spring to get a more desired force.

Figure 3:
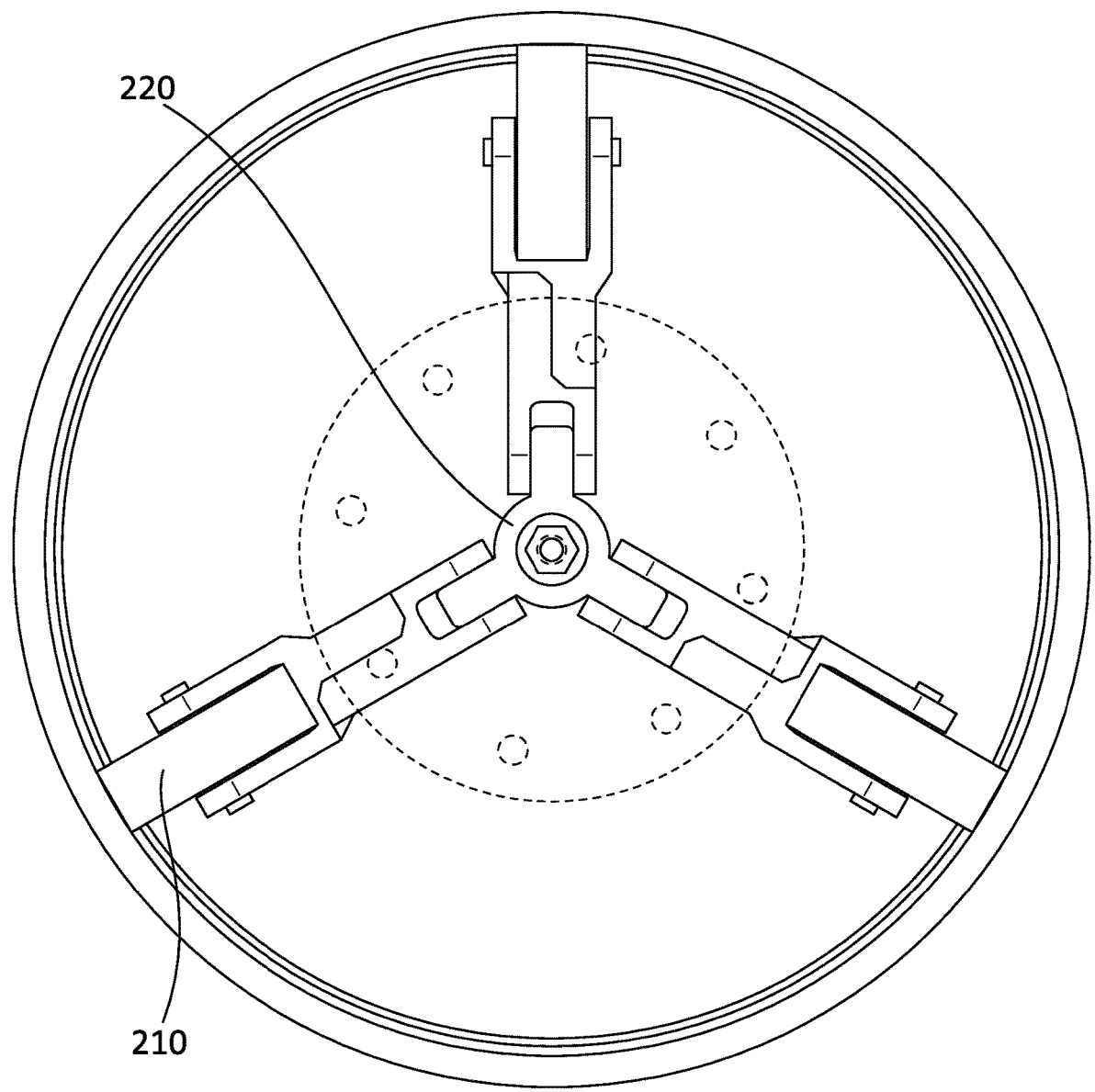
FIG. 3 is a cross-sectional cutaway view of the in-pipe passive centering mechanism of FIGS. 2A-2B.

FIG. 3 is a cross-sectional cutaway view of the in-pipe passive centering mechanism of FIGS. 2A-2B. Because of the orientation, the wheel sets in FIG. 3 each appear as single wheels 210, and only one sliding ring 220 is visible as well. The passive centering mechanism of FIGS. 2A-3 is built on a tri-wheel configuration, as visible in FIG. 3. By building a symmetric pattern of wheel sets about the pipe axis, the outward force attributed to the compression spring 240 is opposed by comparable opposite forces exerted by the inside wall of the pipe, which centers the mechanism with respect to the pipe axis. In other embodiments, the design is adapted for additional numbers of wheel sets (e.g., to have more rigid support) or different symmetries about the pipe axis. The design is primarily based on a four-bar linkage mechanism, where all the wheel supports (or legs) have the same length and are coupled with one compression spring 240 which pushes them simultaneously to attach to the inner wall of the pipe and thereby achieve centering. This mechanism is designed to go through (pass over) weld beads and different pipeline schedules without manual adjustment or actuation, all while still maintaining centering or alignment with the pipe axis.

Figure 4:
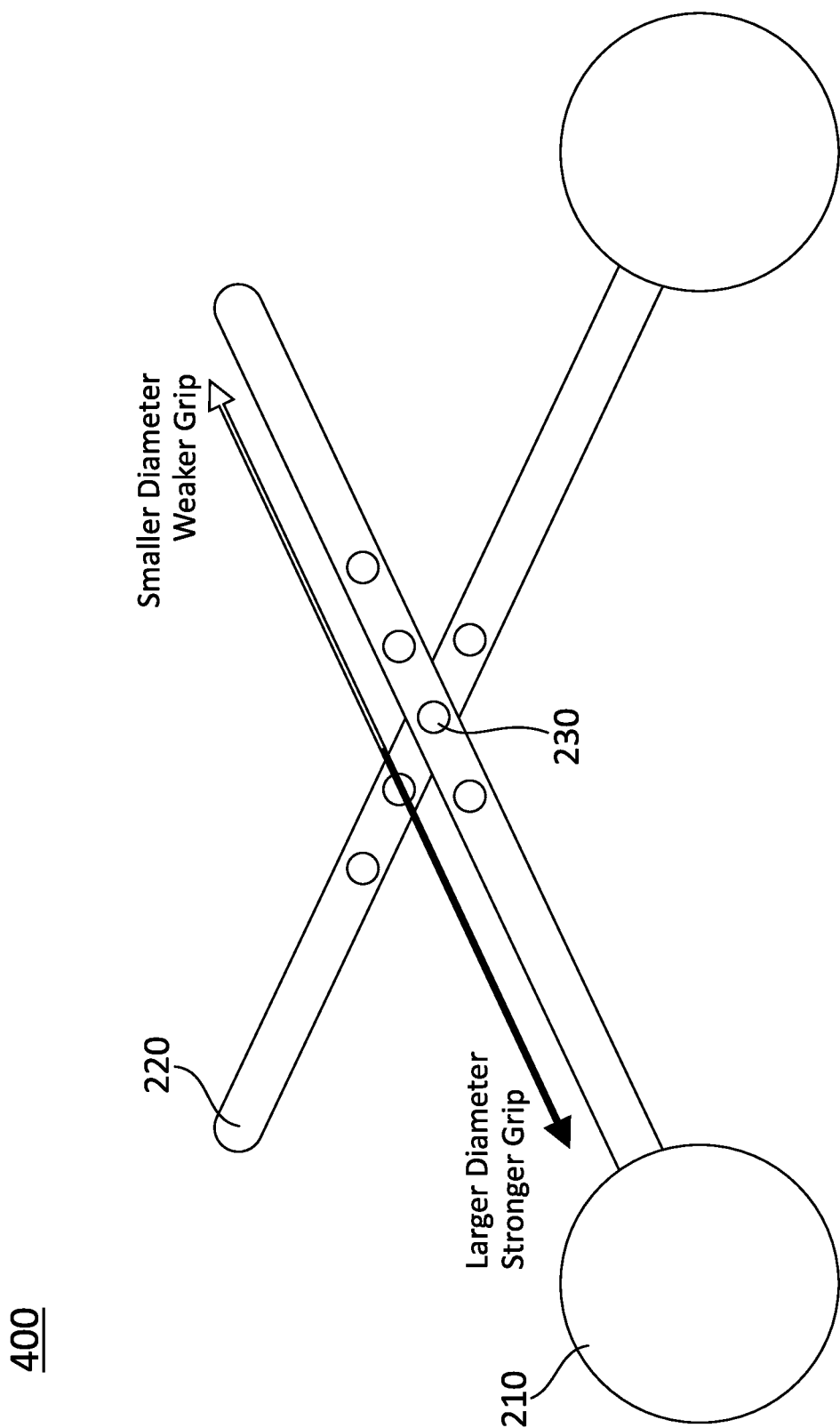
FIG. 4 is a schematic diagram of an example pivot point adjustment mechanism, such as for use with the in-pipe passive centering mechanism of FIGS. 2A-3, according to an embodiment.

FIG. 4 is a schematic diagram of an example pivot point adjustment mechanism 400, such as for use with the in-pipe passive centering mechanism of FIGS. 2A-3, according to an embodiment. For ease of description, FIG. 4 is described and illustrated in terms of the passive centering mechanism of FIGS. 2A-3, including wheels 210, sliding ring attachments 220, and pivot points 230. The legs (support links) in the pivot point adjustment mechanism 400 each have four slots for possible pivot point locations. In other embodiments, different numbers of slots (or variably-sized pivot point attachments) are provided. If, for example, a stronger or weaker grip (or force on the inside wall of the pipe) is desired, the pivot point 230 can be adjusted to acquire different grip strengths (force levels). For example, moving the pivot point 230 closer to the wheels 210 produces a stronger grip (larger force on the inside wall), while moving the pivot point 230 closer to the sliding ring attachments 220 produces a weaker grip (smaller force on the inside wall). Likewise, when the centering mechanism is inserted inside a different pipe size, an equivalent grip force can be maintained by adjusting the pivot points 230 of the support links (e.g., closer to the wheels 210 when moving to a larger pipe size, and closer to the sliding rings 220 when moving to a smaller pipe size).

Figure 5:
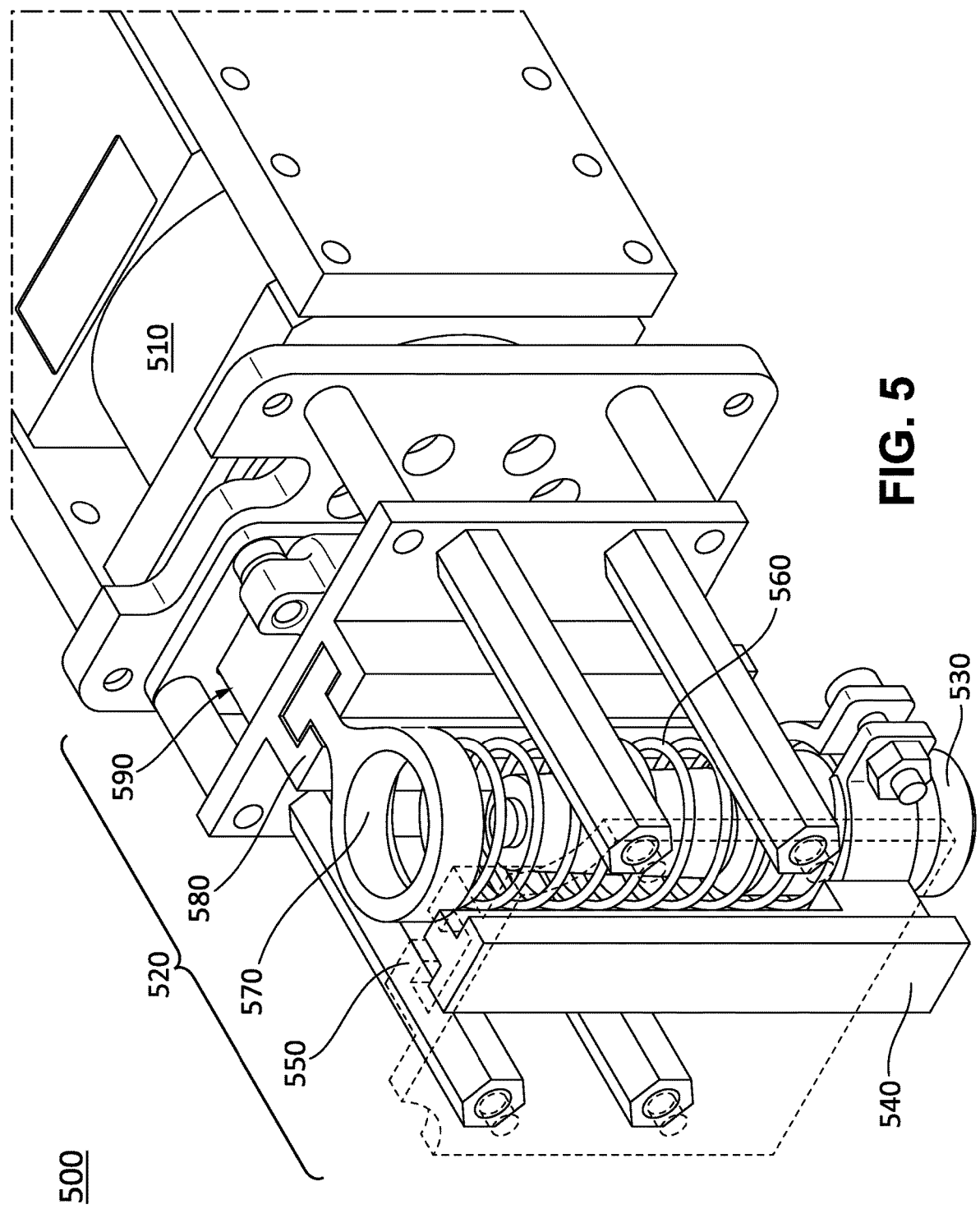
FIG. 5 is an oblique cutaway view of an example radial deployment mechanism, such as for use with the pipeline apparatus of FIG. 1, according to an embodiment.
Figure 6:
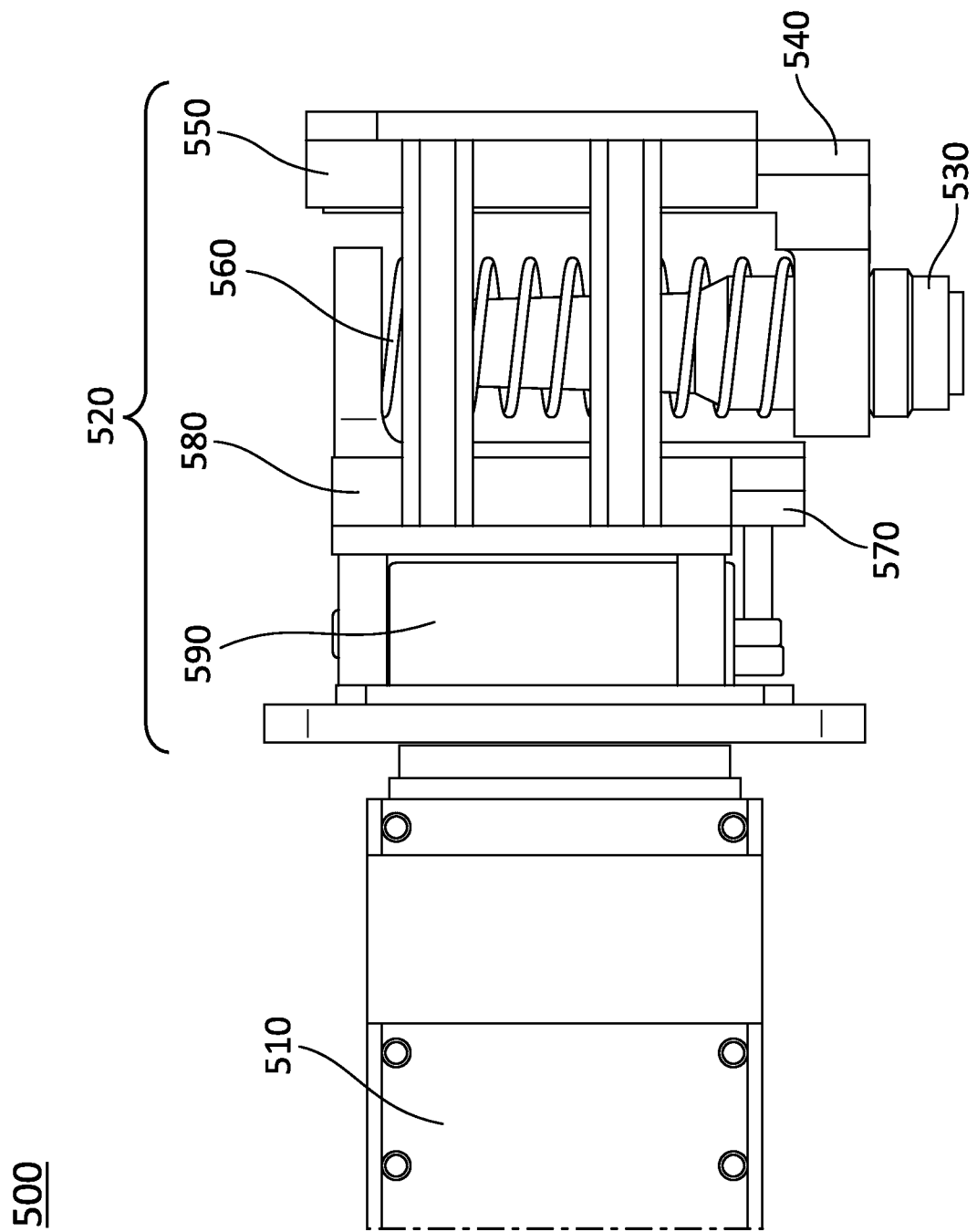
FIG. 6 is a cross-sectional view of the radial deployment mechanism of FIG. 5.

FIG. 5 is an oblique cutaway view of example rotational and radial deployment mechanisms 500, such as for use in deploying a probe or tool using the pipeline apparatus 100 of FIG. 1, according to an embodiment. FIG. 6 is a cross-sectional view of the rotational and radial deployment mechanisms 500 of FIG. 5. The illustrated deployment mechanism includes servo motor 510 for rotating a radial deployment mechanism 520 about an axis of rotation (e.g., aligned with the pipe axis by a passive centering mechanism as described elsewhere). The radial deployment can include, for example, rotating the radial deployment mechanism 520 to enable radial deployment of the probe or tool to a specific target point (e.g., specific angle of rotation) on the inside of the pipe.

Referring to FIGS. 5 and 6, the radial deployment mechanism 520 includes a probe 530 (such as a DFT probe) coupled or attached to a probe slider 540. For example, the probe slider 540 can be firmly attached to the probe 530 such that the two structures move as a unit. The probe slider 540 is configured to move radially along a (probe) linear guide 550. The probe slider 540 is also coupled to, attached to, or in contact with (or configured to contact) a spring 560, such as at one end of the spring 560. The spring can be a compression spring or a tension spring, depending on the embodiment. The other end of the spring 560 is coupled to, attached to, or in contact with (or configured to contact) a spring slider 570. For example, the spring slider 570 can be firmly attached to the other end of the spring 560 such that the spring slider 570 and the other end of the spring 560 move as a unit.

The spring slider 570 is configured to move radially along a (spring) linear guide 580 under the control of a linear actuator 590 which is coupled to the spring slider 570 and drives the spring slider 570 along the spring linear guide 580. As such, the coupling, attachment, or contact of the spring 560 and the probe slider 540 causes the probe slider 540 and the probe 530 to move concurrently, if not simultaneously, in the radial direction when the linear actuator actuates the spring slider 570 and its spring 560. Accordingly, the radial deployment mechanism 520 linearly actuates the spring slider 570 along the spring linear guide 580, to radially deploy the probe 530 in the radial direction until the probe 530 touches the target point on the inside wall of the pipe and the spring 560 exerts a desired amount of outward force on the probe 530 in the radial direction against the target point.

Briefly, the probe 530 is deployed and retracted to take measurements using the linear actuator 590 and the motor 510 that rotates the probe holder 540. The mechanism 520 includes the spring slider 570 that is actuated by the linear actuator 590 to push the spring 560. The spring 560 transfers the motion to the probe holder 540 which is linearly constrained using another slider 540 and linear guide 550 pair. The spring 560 also aids the deployment of the probe 530 and ensures that the probe 530 is pressed with the required force on the pipe wall to take reliable measurements. Thus, the combination of a passive adaptable centering mechanism and a consistent probe or tool deployment mechanism offers reliable results to deploy a probe or tool and account for the different pipes sizes.

Figure 7:
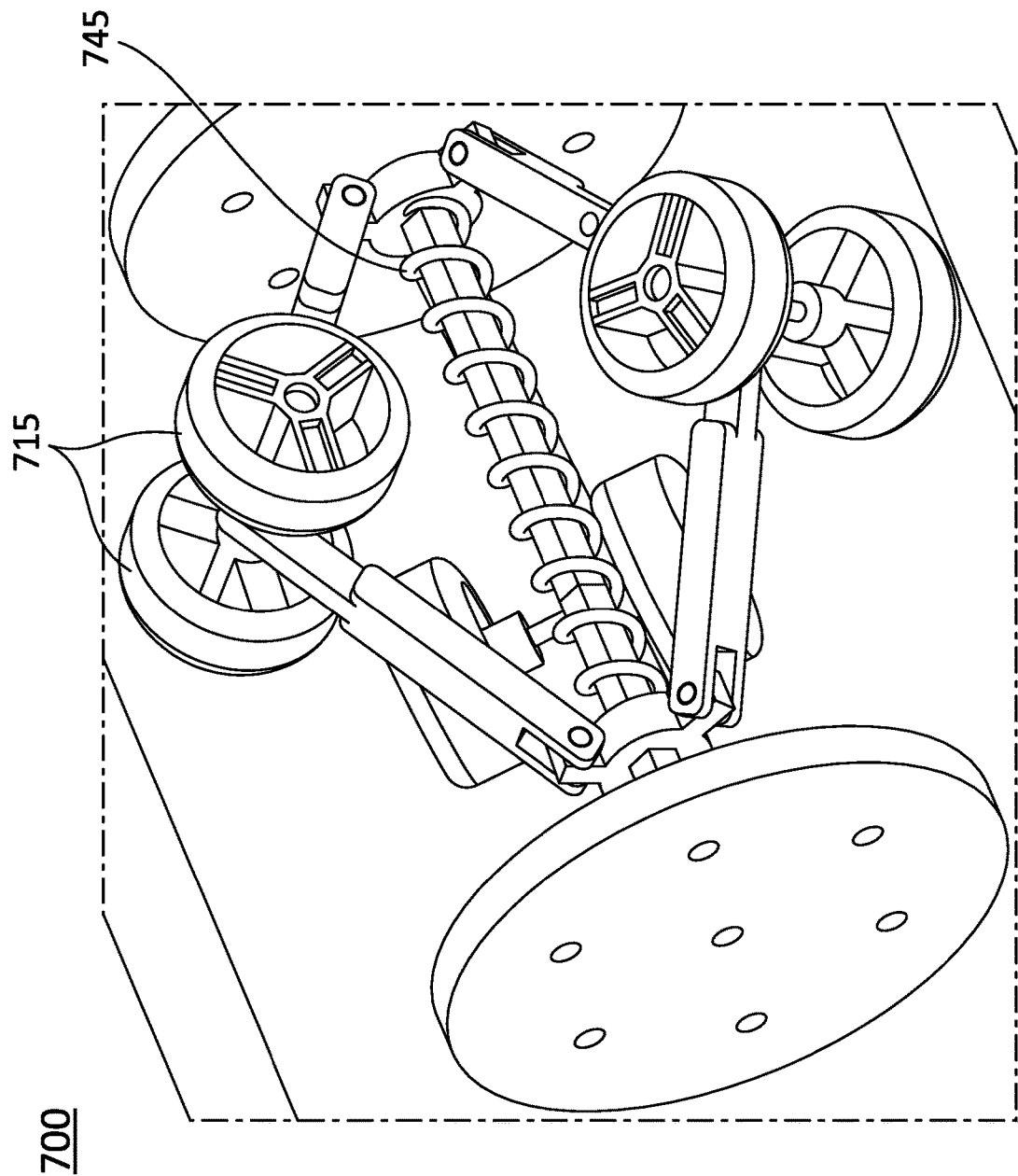
FIG. 7 is an oblique cutaway view of an example in-pipe passive centering mechanism, such as for use with the pipeline apparatus of FIG. 1, according to another embodiment.

FIG. 7 is an oblique cutaway view of an example in-pipe passive centering mechanism 700, such as for use with the pipeline apparatus 100 of FIG. 1, according to another embodiment. The centering mechanism 700 of FIG. 7 differs from that of FIGS. 2A-3 in several aspects. For one, the compression spring 240 is replaced with a tension spring 745 placed between the sliding rings (e.g., within the supporting links or legs, to inwardly contract the sliding rings). For another, the wheels 715 in the wheel sets of the centering mechanism 700 are arranged laterally (e.g., side-to-side), as opposed to longitudinally in the centering mechanism of FIGS. 2A-3. For yet another, the legs (or support links) in centering mechanism 700 are joined at the ends to a common axle for the two wheels 715 in each wheel set (and thus, there are no pivot points like the pivot points 230 in the centering mechanism of FIGS. 2A-3). Different embodiments are possible by combining different subsets of the previous embodiments, in order to establish a passive centering structure consistent with the present disclosure. As such, features such as the number, type, and location of springs in the pipeline apparatus can vary between embodiments.

For example, in the embodiment of FIG. 7, the centering mechanism 700 is pivoted at both ends of each of the support links such that one end pivots at the sliding ring and the other end pivots at the wheels 715. Before inserting the mechanism 700 inside the pipe, the wheels 715 are pushed to spread the legs (support links) to their maximum length position as the spring 745 applies tension to return to its original position. Once the mechanism 700 is inserted inside the pipe, the wheels 715 push the sliding rings, which stretches the spring 745. The stretched spring 745 provides the required force to keep the wheels 715 attached to the pipe walls and the module centered. Since the supporting members are all the same length for the three wheels (wheel sets), centering is achieved. In another embodiment, to achieve the centering using a similar mechanism to mechanism 700, the tension spring 745 is replaced with a compression spring placed outside one of the sliding rings.

Figure 8:
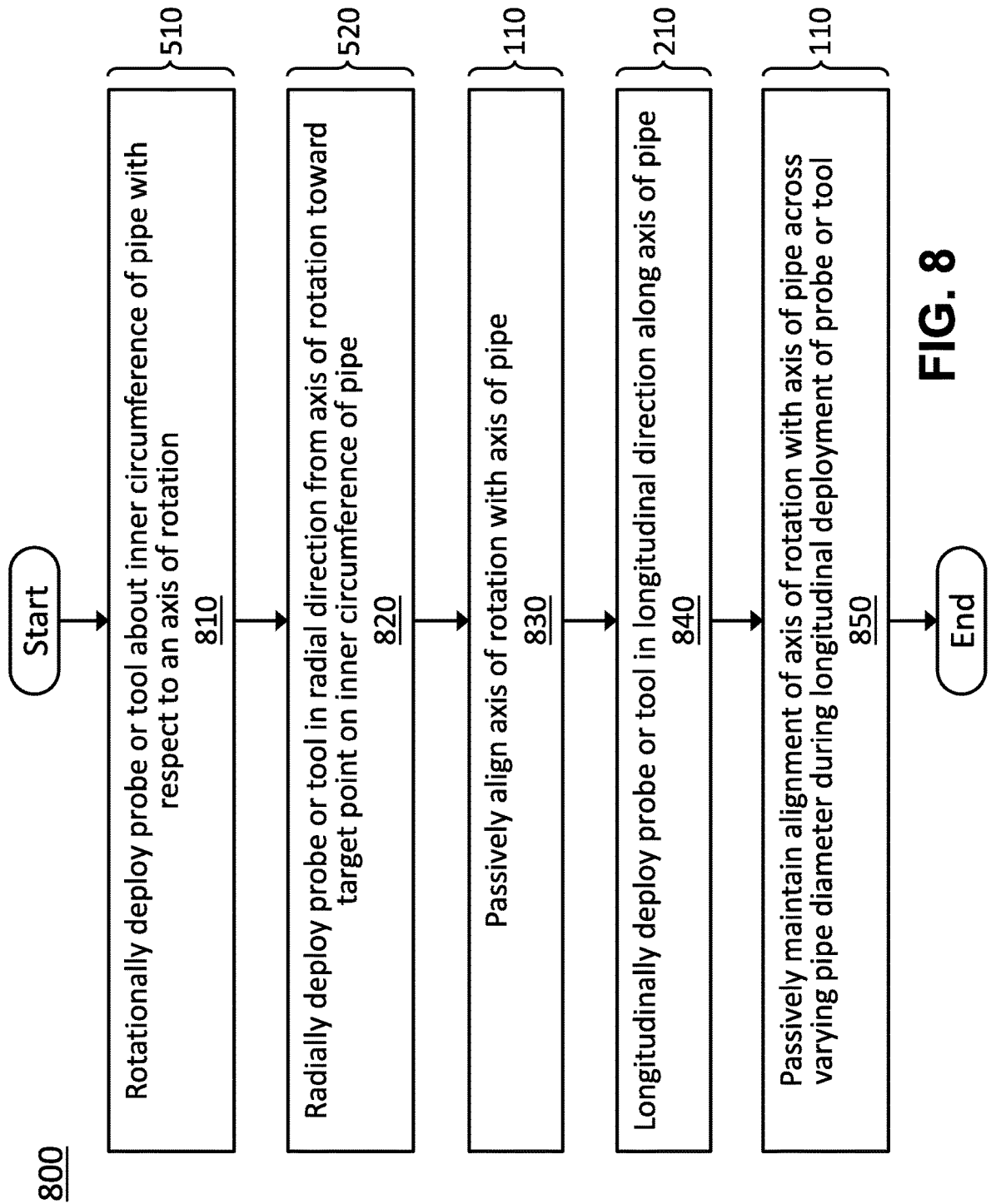
FIG. 8 is a flow chart of an example method of in-pipe inspection or maintenance of a pipe, according to an embodiment.

FIG. 8 is a flow chart of an example method 800 for in-pipe inspection or maintenance of a pipe, such as for use by the pipeline apparatus 100, according to an embodiment. Some or all of the method 800 can be performed using components and techniques illustrated in FIGS. 1-7. Portions of this and other methods disclosed herein can be performed on or using a custom or preprogrammed logic device, circuit, or processor, such as a programmable logic circuit (PLC), computer, software, or other circuit (e.g., ASIC, FPGA) configured by code or logic to carry out their assigned task. The device, circuit, or processor can be, for example, a dedicated or shared hardware device (such as a laptop, a workstation, a tablet, a smartphone, part of a server, or a dedicated hardware circuit, as in an FPGA or ASIC, or the like), or computer server, or a portion of a server or computer system. The device, circuit, or processor can include a non-transitory computer readable medium (CRM, such as read-only memory (ROM), flash drive, or disk drive) storing instructions that, when executed on one or more processors, cause portions of the method 800 (or other disclosed method) to be carried out. It should be noted that in other embodiments, the order of the operations can be varied, and that some of the operations can be omitted.

In the example method 800, processing begins with automatically rotationally deploying 810 a probe or tool about an inner circumference of the pipe with respect to an axis of rotation. This can be done, for example, using the servo motor 510 under control of corresponding electronics configured by code or logic to drive the servo motor 510 to rotate the tool or probe to the appropriate angle of rotation to deploy to a desired target point on the inner wall of the pipe. The method 800 further includes radially deploying 820 the probe or tool in a radial direction from the axis of rotation toward the target point on the inner circumference of the pipe. This can be done, for example, using the radial deployment mechanism 520. The method 800 also includes passively aligning 830 the axis of rotation with the axis of the pipe. This can be done, for example, using the passive centering mechanism 110.

In addition, the method 800 includes automatically longitudinally deploying 840 the probe or tool in a longitudinal direction along the axis of the pipe. The can be done, for example, using wheels 210, a motor, and control circuitry configured by code or other logic to drive the apparatus in the longitudinal direction to the appropriate longitudinal position to deploy the probe or tool. Further, the method 800 includes passively maintaining 850 alignment of the axis of rotation with the axis of the pipe across varying pipe diameters during the longitudinal deployment of the probe or tool. This can be accomplished, for example, using the passive centering mechanism 110.

Further example embodiments of the present disclosure are directed to an automated probe or tool deployment apparatus having a dual slider mechanism to perform the automated probe or tool deployment. The dual slider is a simple and efficient mechanism to actuate the probe or tool in, on, or next to various target surfaces or objects, such as a small diameter pipe or a large storage vessel. Further, the dual slider can deploy probes and tools with a certain or desired force on the target surface. The dual slider has less complexity than comparable automated approaches. In this technique, the probe or tool is deployed towards the target surface by attaching the probe or tool to a linear guide coupled with a spring that is actuated by a linear actuator.

In some embodiments, the dual slider mechanism is further actuated by being supported by another deployment mechanism, such as a rotational deployment mechanism to rotate the dual slider mechanism about an axis of rotation. As such, the dual slider mechanism can supply a radial deployment from the axis of rotation. In still other embodiments, a longitudinal deployment mechanism is provided, to deploy the probe or tool longitudinally, such as along the axis of rotation or other axis perpendicular to the linear actuator direction. Together, the dual slider, rotational deployment, and longitudinal deployment mechanisms can deploy the probe or tool properly in a three-dimensional space. In some embodiments, the dual slider mechanism is located on (such as at an end of) an articulated robotic arm for deploying to a desired location.

When the linear actuator extends, the probe or tool deploys until it touches the desired contact point, object, or surface (or other target, all of which can be referred to as a target surface for ease of description). Then the spring absorbs any additional load experienced by the probe or tool as the linear actuator continues to actuate. This helps ensure reliable deployment, such as at a certain or desired force, or at a certain or desired angle (e.g., perpendicular) to the target surface. In some such embodiments, the apparatus can be utilized in various applications to deploy, for example, measurement probes that require a certain push force to properly be deployed. The apparatus uses a linear actuator to perform the actuation. The types of probe measurements can include, for example, coating film thickness measurements, ultrasonic testing (UT) thickness measurements, and cathodic protection measurements, to name a few.

Examples of different applications where this dual slider mechanism can be used include mounting the dual slider on a magnetic robotic crawler that inspects tank shells or pipe walls (internally or externally), such as for storage tanks or pipelines. In other example embodiments, the dual slider is mounted on a drone (such as an unmanned aerial vehicle or UAV) that monitors and inspects assets such as pipes, tanks, vessels, structures, columns, and the like. In yet other example embodiments, the dual slider mechanism is mounted as an end-effector of a robotic arm. The robotic arm can be, for example, stationed at a factory, mounted on a ground robotic vehicle, or the like.

As discussed earlier, automated inspection and maintenance can be a challenging task as it can require certain functions to be executed in a limited space using remotely operated or autonomous robots or crawlers. Compounding these challenges includes the need for proper deployment of the probes and tool heads to achieve desired output, such as with certain or desired contact angles or forces. Other ways of addressing these concerns can rely on manual deployment of the probe or tool. These approaches can require manual intervention (and loss of accuracy) or lead to inconsistent measurements or deployments, with consequential unreliable or less reliable results compared to using automated techniques disclosed herein.

Accordingly, in an example embodiment, an automated probe and tool deployment apparatus having a linear actuator to deploy probes and tools is provided. The linear actuator is part of a dual slider mechanism, which uses a spring to provide reliable probe and tool deployment, such as with a desired or certain force on, or at a desired or specific angle relative to, the target surface. The dual slider uses a pair of linear guides to guide the two sliders using the linear actuator and the spring to actuate the probe or tool. The linear guides are parallel to each other. In addition, the corresponding sliders are coupled by the spring so that when the linear actuator moves one of the sliders (e.g., a spring slider), the coupled spring causes the other slider (e.g., a probe or tool slider) to move, or to deploy with stronger force (e.g., when further moving is constrained by contacting a target surface). In some embodiments, additional deployment mechanisms, such as rotational or further linear (e.g., in axes perpendicular to that of the linear actuator) are provided to, for example, increase the range or number of dimensions of deployment of the probe or tool.

Throughout, a dry film thickness (DFT) probe continues to be used and illustrated as an example probe or tool for use with some embodiments. While this probe should be deployed perpendicularly on the surface of interest to take a reliable measurement (such as within the range of "perpendicular" noted previously), other embodiments are directed to deploying probes or tools at angles other than perpendicular. In still other embodiments, the spring and sliders are configured to deploy the probe or tool at a desired or certain force on the target surface. For example, the linear actuator actuates the spring slider to move the probe or tool (e.g., by the probe or tool slider) toward the target surface. After contacting the target surface, further actuation by the linear actuator increases the force of contact of the probe or tool on the target surface.

In example embodiments, the dual slider mechanism deploys a probe or tool in the linear dimension towards a target point, surface, or object. The dual slider includes a linear actuator to deploy the probe or tool in a linear direction (e.g., radially, longitudinally, laterally) toward a target point on a deployment surface, such as the inside or outside wall of a pipeline, storage tank, or other vessel or container. The linear deployment of the probe or tool can be, for example, perpendicular to the target point on the deployment surface (such as perpendicular to a tangent line of the deployment surface at the target point). Further details are described in connection with FIGS. 9-10 below.

Figure 9:
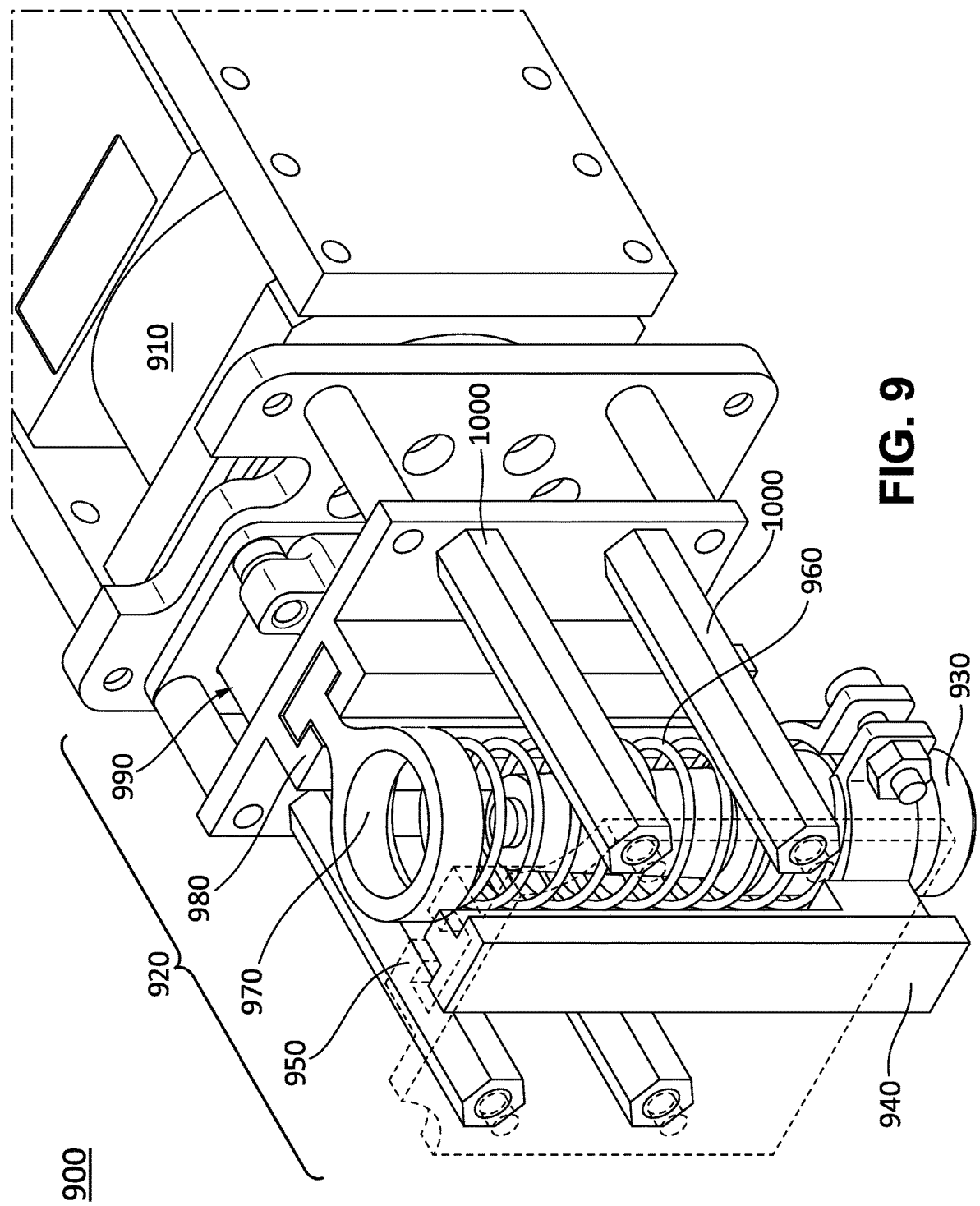
FIG. 9 is an oblique cutaway view of an example dual slider mechanism, such as for use with an automated probe or tool deployment apparatus, according to an embodiment.
Figure 10:
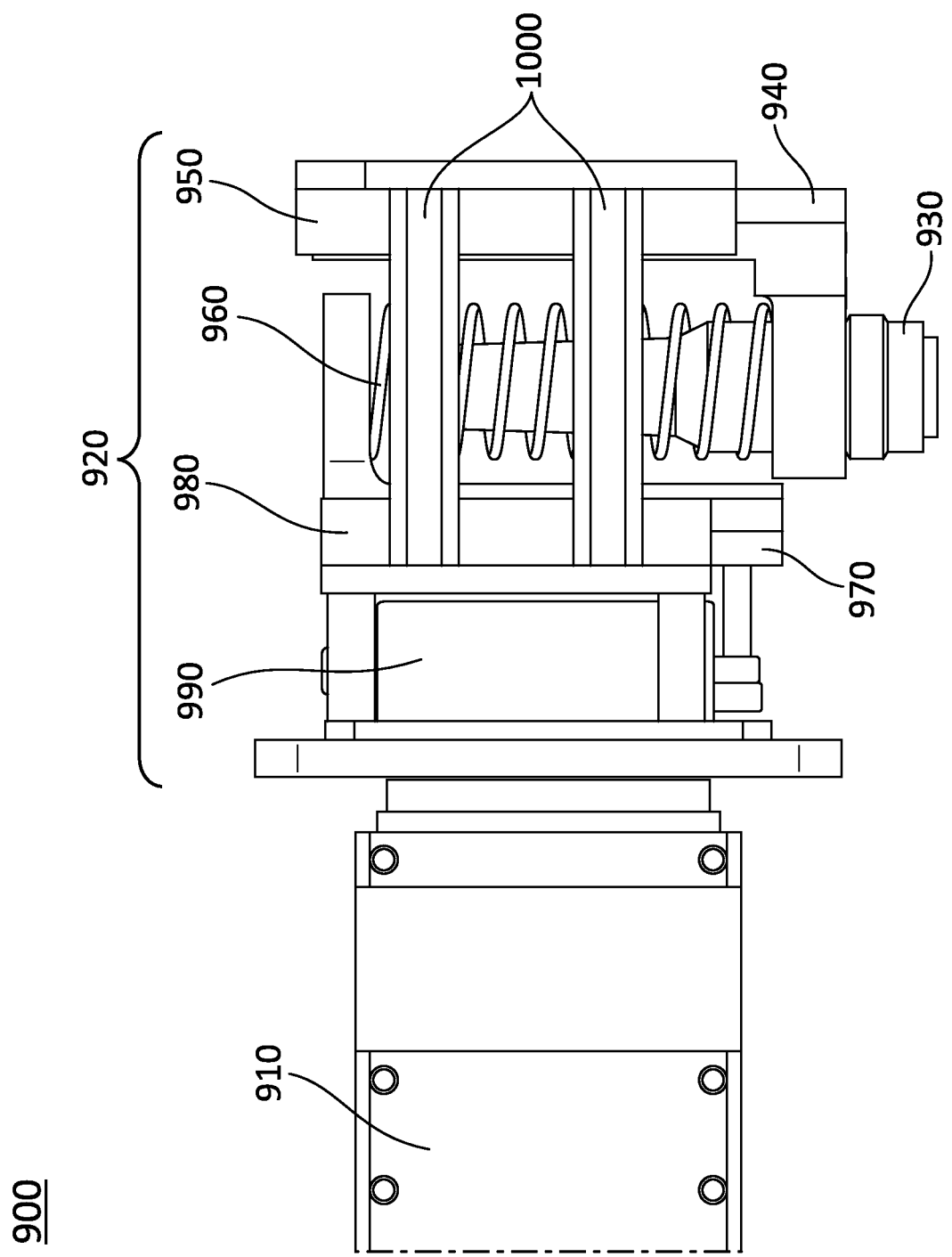
FIG. 10 is a cross-sectional view of the dual slider mechanism of FIG. 9.

FIG. 9 is an oblique cutaway view of an example dual slider mechanism 920, such as for use with an automated probe or tool deployment apparatus 900, according to an embodiment. FIG. 10 is a cross-sectional view of the dual slider mechanism 920 of FIG. 9. The dual slider mechanism 920 includes a frame 1000 for coupling the components of the dual slider mechanism 920 into a single package. The dual slider mechanism 920 includes some components that are fixed (e.g., linear guides 950 and 980, linear actuator 990) with respect to the frame 1000, and some components that move (e.g., sliders 940 and 970, spring 960) with respect to the frame 1000. However, the movable components of the dual slider mechanism 920 only move within a constrained degree of freedom relative to the fixed components. As such, the frame 1000 and other fixed components of the dual slider mechanism 920 define the fixed relationships between the components while constraining the variable relationships with the movable components.

Because the dual slider mechanism 920 operates as a unit, the illustrated probe or tool deployment apparatus 900 includes a rotational deployment mechanism, including servo motor 910, for rotating the dual slider mechanism 920 about an axis of rotation. However, the use of such a deployment mechanism of the dual slider mechanism 920 is but an example. In other embodiments, zero, one, two, or more other deployment mechanisms (e.g., rotational, lateral, and the like) are provided to, for example, give more degrees of freedom to the dual slider mechanism 920 to help deploy a probe or tool, such as probe 930. The servo motor 910 rotates the dual slider mechanism 920 about the rotation axis to direct (e.g., align) linear guides 950 and 980 in the desired or required rotational direction for deploying the probe 930. In other embodiments, different deployment mechanisms actuate or move the dual slider mechanism 920 to align the linear guides 950 and 980 in the desired or required direction for deploying the probe 930.

In further detail, and with reference to FIGS. 9-10, the dual slider mechanism 920 includes the probe 930 (such as a DFT probe) coupled or attached to a probe slider 940. For example, the probe slider 940 can be firmly attached to the probe 930 such that the two structures move as a unit. The probe slider 940 is configured to move linearly along the linear guide 950 (e.g., probe linear guide 950). The probe slider 940 is also coupled to, attached to, or in contact with (or configured to contact) a spring 960, such as at one end of the spring 960. The spring 960 can be a compression spring or a tension spring, depending on the embodiment. The other end of the spring 960 is coupled to, attached to, or in contact with (or configured to contact) a spring slider 970. For example, the spring slider 970 can be firmly attached to the other end of the spring 960 such that the spring slider 970 and the other end of the spring 960 move as a unit.

The spring slider 970 is configured to move linearly along the linear guide 980 (e.g., spring linear guide 980) under the control of a linear actuator 990, which is coupled to the spring slider 970 and drives the spring slider 970 along the spring linear guide 980. As such, the coupling, attachment, or contact of the spring 960 and the probe slider 940 causes the probe slider 940 and the probe 930 to move concurrently, if not simultaneously, in the radial direction when the linear actuator actuates the spring slider 970 and its spring 960. Accordingly, the dual slider mechanism 920 linearly actuates the spring slider 970 along the spring linear guide 980, to linearly deploy the probe 930 in the desired direction until the probe 930 touches the target point, surface, or object and the spring 960 exerts a desired amount of outward force on the probe 930 in the linear direction against the target point, surface, or object.

Briefly, the probe 930 is deployed and retracted to take measurements, for example, using the linear actuator 990 and the motor 910 that rotates the probe holder 940. The mechanism 920 includes the spring slider 970 that is actuated by the linear actuator 990 to push the spring 960. The spring 960 transfers the motion to the probe holder 940, which is linearly constrained using another slider 940 and linear guide 950 pair. The spring 960 also aids the deployment of the probe 930 and ensures that the probe 930 is pressed with the desired or required force on the target surface to take reliable measurements. Thus, the combination of two sliders coupled by a spring and driven by a linear actuator provides for a consistent probe or tool deployment mechanism that offers reliable results to deploy a probe or tool with the desired pressure or force on the target surface.

Figure 11:
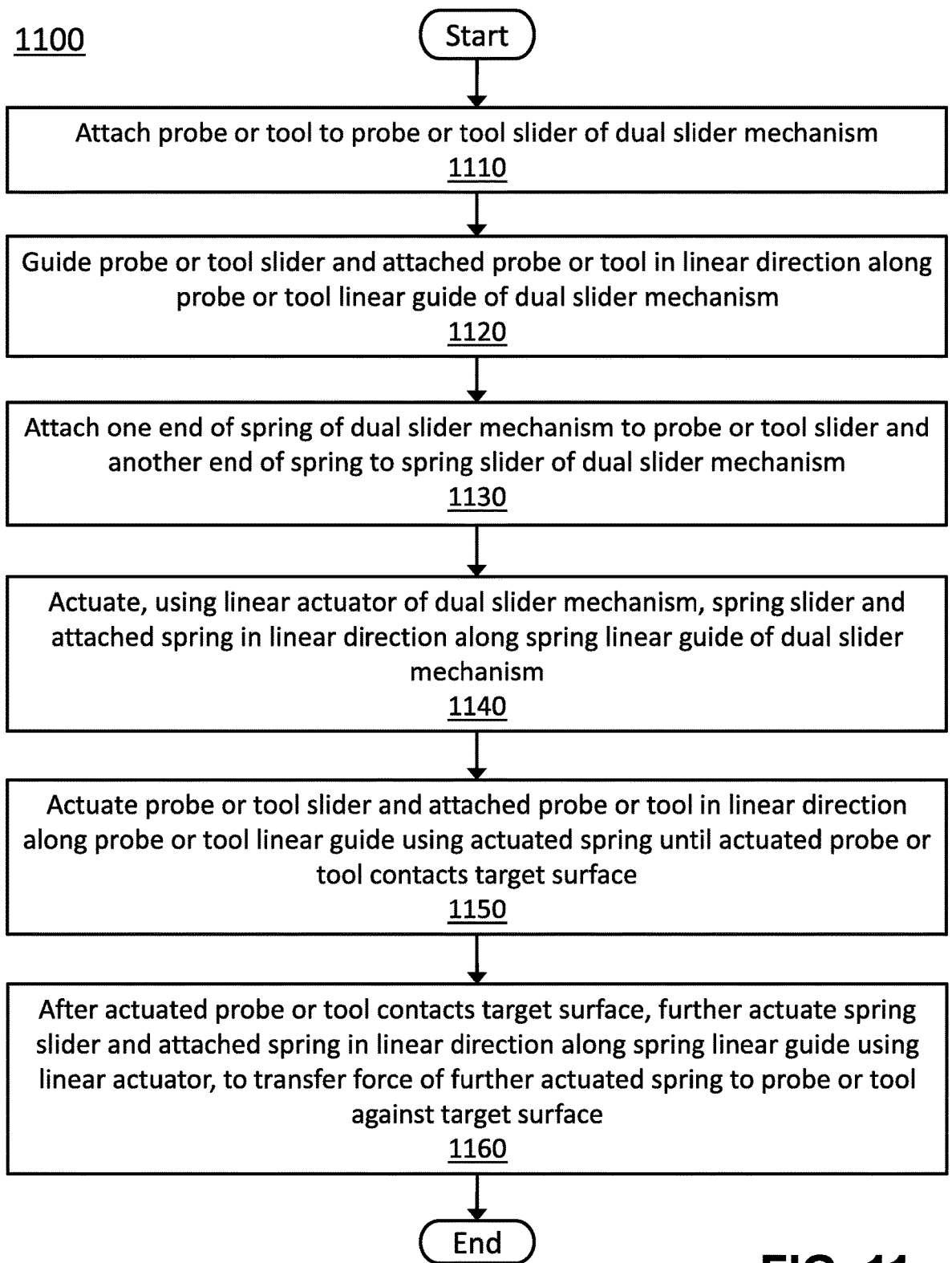
FIG. 11 is a flow chart of an example method of automated inspection or maintenance using a dual slider mechanism for deploying a probe or tool, such as the dual slider mechanism of FIGS. 9-10, according to an embodiment.

FIG. 11 is a flow chart of an example method 1100 of automated inspection or maintenance using a dual slider mechanism for deploying a probe or tool, such as the dual slider mechanism 920 of FIGS. 9-10, according to an embodiment. Some or all of the method 1100 can be performed using components and techniques illustrated in FIGS. 1-10. In the example method 1100, processing begins with attaching at step 1110 the probe or tool (such as probe 930) to a probe or tool slider (such as probe slider 940) of the dual slider mechanism, and guiding at step 1120 the probe or tool slider and attached probe or tool in a linear direction along a probe or tool linear guide (such as probe linear guide 950) of the dual slider mechanism. The probe or tool linear guide is coupled to a frame (such as frame 1000) of the dual slider mechanism.

In addition, the step of guiding 1120 the probe or tool slider and attached probe or tool includes attaching at step 1130 one end of a spring (such as spring 960) of the dual slider mechanism to the probe or tool slider and another end of the spring to a spring slider (such as spring slider 970) of the dual slider mechanism. Guiding 1120 the probe or tool slider and attached probe or tool further includes guiding the spring slider and attached spring in the linear direction along a spring linear guide (such as spring linear guide 980) of the dual slider mechanism. The spring linear guide is also coupled to the frame. Further, guiding 1120 the probe or tool slider and attached probe or tool includes guiding the probe or tool slider and attached probe or tool in the linear direction along the probe or tool linear guide using the guided spring.

In one embodiment, guiding the spring slider and attached spring includes actuating at step 1140, using a linear actuator (such as linear actuator 990) of the dual slider mechanism, the spring slider and attached spring in the linear direction along the spring linear guide. The linear actuator is coupled to the frame. In addition, guiding the probe or tool slider and attached probe or tool using the guided spring includes actuating at step 1150 the probe or tool slider and attached probe or tool in the linear direction along the probe or tool linear guide using the actuated spring.

In one embodiment, the step of actuating 1150 the probe or tool slider and attached probe or tool includes actuating the probe or tool slider and attached probe or tool until the actuated probe or tool contacts a target surface (such as the inner or outer wall of a pipeline or storage vessel). In one or more embodiments, the method 1100 further includes: after the actuated probe or tool contacts the target surface, further actuating 1160 the spring slider and attached spring in the linear direction along the spring linear guide using the linear actuator; and transferring force of the further actuated spring to the probe or tool against the target surface.

Figure 12:
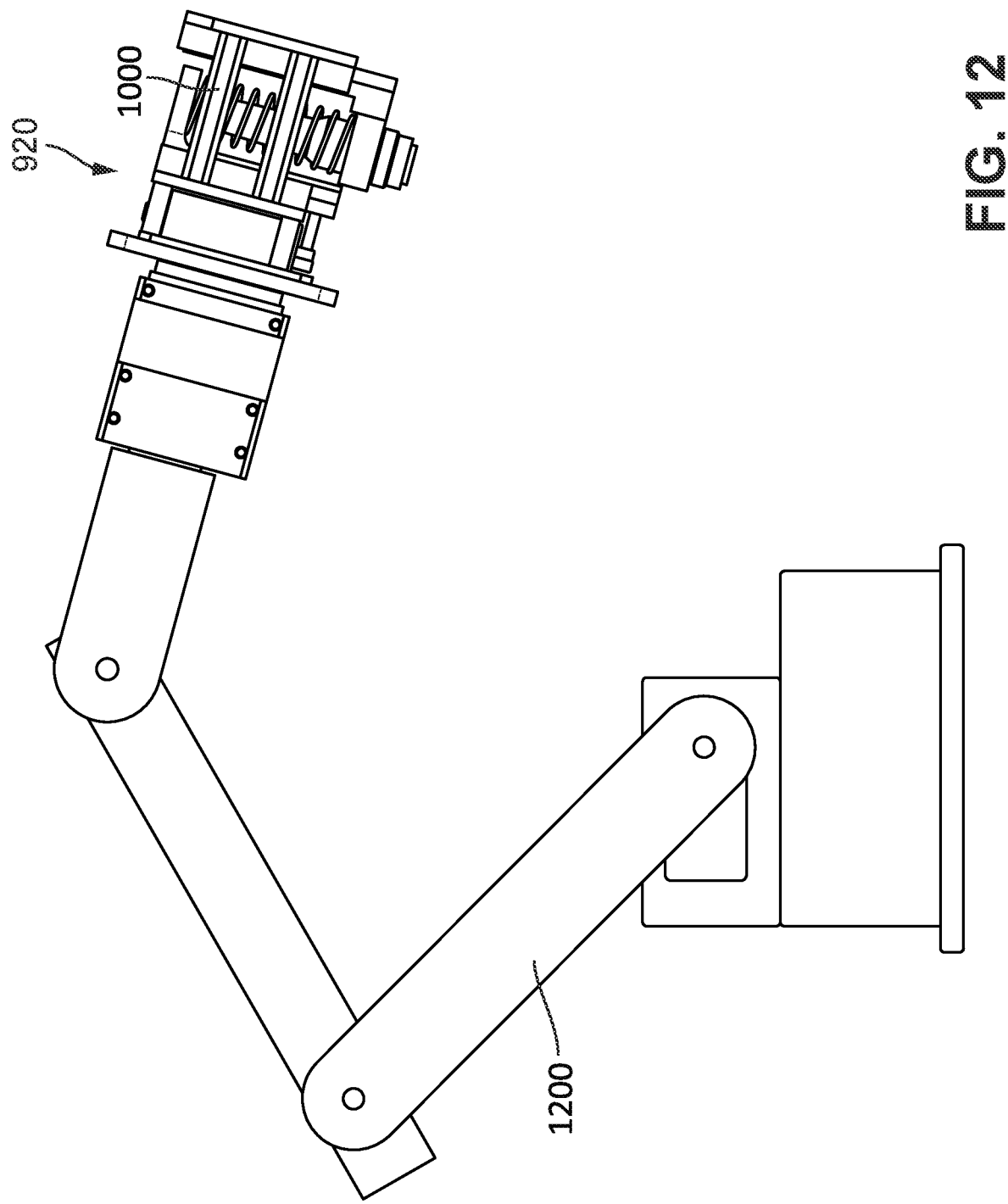
FIG. 12 is a side view of an example robotic arm coupled to the frame of the dual slider mechanism of FIGS. 9-10, according to an embodiment.

FIG. 12 is a side view of an example robotic arm 1200 coupled to the frame 1000 of the dual slider mechanism 920 of FIGS. 9-10, according to an embodiment. In FIG. 12, the dual slider mechanism 920 is attached as an end effector to the robotic arm 1200.

Figure 13:
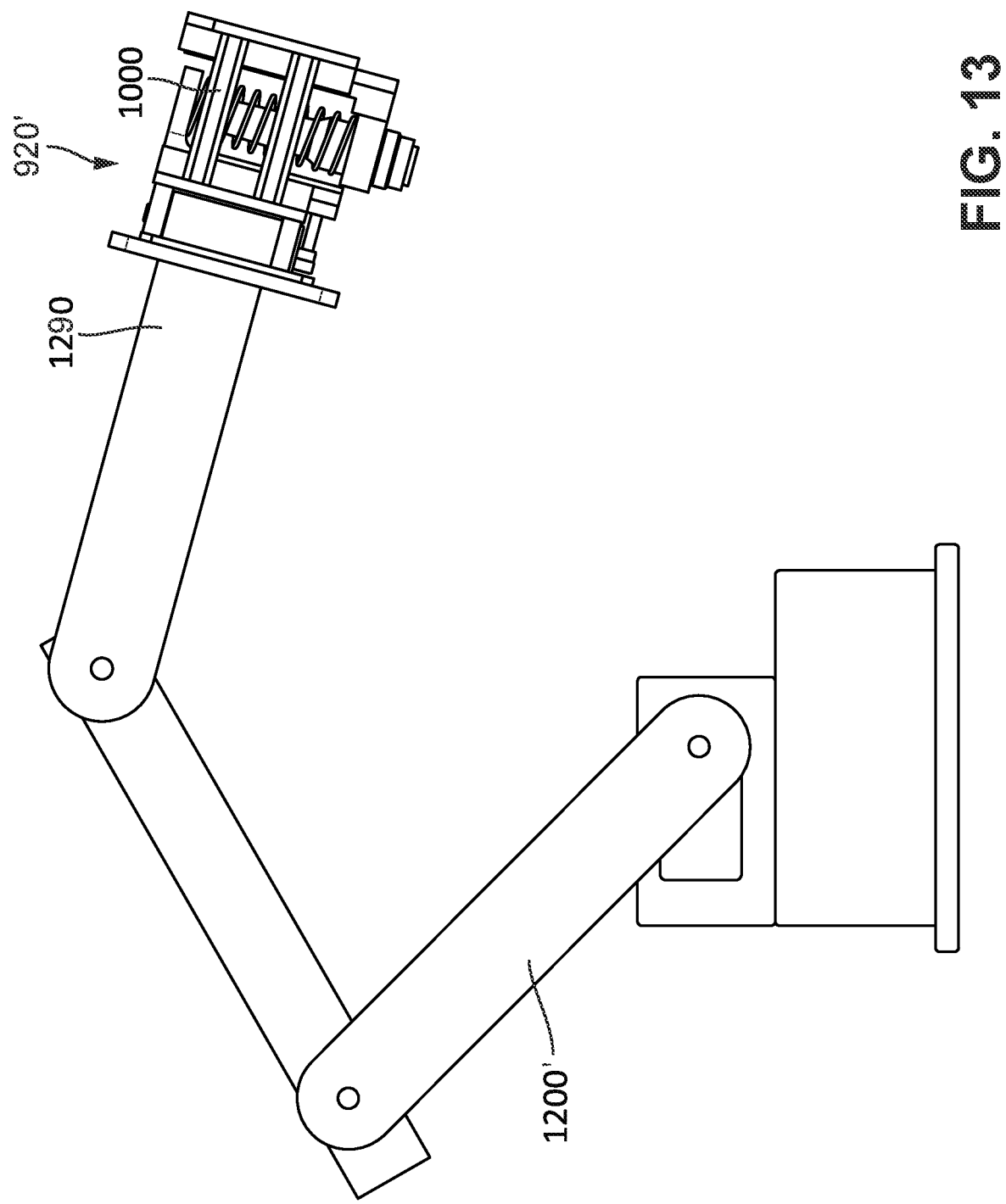
FIG. 13 is a side view of an example robotic arm coupled to the frame of a dual slider mechanism, according to another embodiment.

FIG. 13 is a side view of an example robotic arm 1200' coupled to the frame 1000 of a dual slider mechanism 920', according to another embodiment. The dual slider mechanism 920' of FIG. 13 is similar to the dual slider mechanism 920 of FIGS. 9-10 and 12, only the linear actuator 990 of the dual slider mechanism 920 of FIGS. 9-10 and 12 has been moved to the end of the robotic arm 1200' of FIG. 13 and renumbered as linear actuator 1290.

Without loss of generality, the term "probe" as used herein can be a component which comprises a sensor configured to sense a condition when in contact with or proximate a surface (e.g., the interior of a pipeline), or can comprise a device (e.g., tool) for performing a particular operating on a structure using the probe once longitudinally and radially deployed, or it can comprise both a sensor and a tool. While the foregoing description has referred to "probe or tool" in the alternative, the term "probe" should be understood as encompassing both devices in certain implementations.

The methods described herein may be performed in part or in full by software or firmware in machine readable form on a tangible (e.g., non-transitory) storage medium. For example, the software or firmware may be in the form of a computer program including computer program code adapted to perform some or all of the steps of any of the methods described herein when the program is run on a computer or suitable hardware device (e.g., FPGA), and where the computer program may be embodied on a computer readable medium. Examples of tangible storage media include computer storage devices having computer-readable media such as disks, thumb drives, flash memory, and the like, and do not include propagated signals. Propagated signals may be present in a tangible storage media, but propagated signals by themselves are not examples of tangible storage media. The software can be suitable for execution on a parallel processor or a serial processor such that the method steps may be carried out in any suitable order, or simultaneously.

It is to be further understood that like or similar numerals in the drawings represent like or similar elements through the several figures, and that not all components or steps described and illustrated with reference to the figures are required for all embodiments or arrangements.

The terminology used herein is for the purpose of describing particular embodiments only and is not intended to be limiting of the scope of the present disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Terms of orientation are used herein merely for purposes of convention and referencing, and are not to be construed as limiting. However, it is recognized these terms could be used with reference to a viewer. Accordingly, no limitations are implied or to be inferred. In addition, the use of ordinal numbers (e.g., first, second, third) is for distinction and not counting. For example, the use of "third" does not imply there is a corresponding "first" or "second." Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

While the disclosure has described several exemplary embodiments, it will be understood by those skilled in the art that various changes may be made, and equivalents may be substituted for elements thereof, without departing from the spirit and scope of the invention. In addition, many modifications will be appreciated by those skilled in the art to adapt a particular instrument, situation, or material to embodiments of the disclosure without departing from the essential scope thereof. Therefore, it is intended that the invention not be limited to the particular embodiments disclosed, or to the best mode contemplated for carrying out this invention, but that the invention will include all embodiments falling within the scope of the appended claims.

What is claimed is:

1. An apparatus for automated inspection or maintenance, the apparatus comprising a dual slider mechanism configured to deploy a probe, the dual slider mechanism comprising:
    a frame;
    a probe slider configured to attach to the probe;
    a probe linear guide coupled to the frame and configured to guide the probe slider and attached probe in a linear direction;
    a spring having one end attached to the probe slider;
    a spring slider attached to another end of the spring; and
    a spring linear guide coupled to the frame and configured to guide the spring slider and attached spring in the linear direction, in order to guide the probe slider and attached probe in the linear direction along the probe linear guide using the guided spring.

2. The apparatus of claim 1, wherein the dual slider mechanism further comprises a linear actuator coupled to the frame and configured to actuate the spring slider and attached spring in the linear direction along the spring linear guide, in order to actuate the probe slider and attached probe in the linear direction along the probe linear guide using the actuated spring.

3. The apparatus of claim 2, wherein after actuating the probe slider and attached probe until the actuated probe contacts a target surface, the linear actuator is further configured to further actuate the spring slider and attached spring in the linear direction along the spring linear guide, in order to transfer force of the further actuated spring to the probe against the target surface.

4. The apparatus of claim 1, further comprising a motor coupled to the frame and configured to rotate the dual slider mechanism about a rotation axis.

5. The apparatus of claim 4, wherein the linear direction is perpendicular to the rotation axis.

6. The apparatus of claim 1, further comprising a robotic arm coupled to the frame and configured to deploy the dual slider mechanism to point toward a target surface.

7. The apparatus of claim 6, wherein the robotic arm comprises a linear actuator coupled to the frame and configured to actuate the spring slider and attached spring in the linear direction along the spring linear guide, in order to actuate the probe slider and attached probe in the linear direction toward the target surface along the probe linear guide using the actuated spring.

8. The apparatus of claim 7, wherein after actuating the probe slider and attached probe in the linear direction until the actuated probe contacts the target surface, the linear actuator is further configured to further actuate the spring slider and attached spring in the linear direction along the spring linear guide, in order to transfer force of the further actuated spring to the probe against the target surface.

9. The apparatus of claim 1, wherein the probe comprises a sensor, a tool, or both a sensor and a tool.

10. A method of automated inspection or maintenance using a dual slider mechanism to deploy a probe, the method comprising:
    attaching the probe to a probe slider of the dual slider mechanism; and
    guiding the probe slider and attached probe in a linear direction along a probe linear guide of the dual slider mechanism, the probe linear guide being coupled to a frame of the dual slider mechanism,
    wherein guiding the probe slider and attached probe comprises:
        attaching one end of a spring of the dual slider mechanism to the probe slider and another end of the spring to a spring slider of the dual slider mechanism;
        guiding the spring slider and attached spring in the linear direction along a spring linear guide of the dual slider mechanism, the spring linear guide being coupled to the frame; and
        guiding the probe slider and attached probe in the linear direction along the probe linear guide using the guided spring.

11. The method of claim 10, wherein:
guiding the spring slider and attached spring comprises actuating, using a linear actuator of the dual slider mechanism, the spring slider and attached spring in the linear direction along the spring linear guide, the linear actuator being coupled to the frame; and
guiding the probe slider and attached probe using the guided spring comprises actuating the probe slider and attached probe in the linear direction along the probe linear guide using the actuated spring.

12. The method of claim 11, wherein:
actuating the probe slider and attached probe comprises actuating the probe slider and attached probe until the actuated probe contacts a target surface; and the method further comprises:
  after the actuated probe contacts the target surface, further actuating the spring slider and attached spring in the linear direction along the spring linear guide using the linear actuator; and
  transferring force of the further actuated spring to the probe against the target surface.

13. The method of claim 10, further comprising rotating the dual slider mechanism about a rotation axis using a motor coupled to the frame.

14. The method of claim 13, wherein the linear direction is perpendicular to the rotation axis.

15. The method of claim 10, further comprising deploying the dual slider mechanism to point toward a target surface using a robotic arm coupled to the frame.

16. The method of claim 15, wherein:
guiding the spring slider and attached spring comprises actuating, using a linear actuator of the robotic arm, the spring slider and attached spring in the linear direction along the spring linear guide, the linear actuator being coupled to the frame; and
guiding the probe slider and attached probe using the guided spring comprises actuating the probe slider and attached probe in the linear direction toward the target surface along the probe linear guide using the actuated spring.

17. The method of claim 16, wherein:
actuating the probe slider and attached probe comprises actuating the probe slider and attached probe until the actuated probe contacts the target surface; and the method further comprises:
  after the actuated probe contacts the target surface, further actuating the spring slider and attached spring in the linear direction along the spring linear guide using the linear actuator; and
  transferring force of the further actuated spring to the probe against the target surface.

18. The method of claim 10, wherein the probe comprises a sensor, a tool, or both a sensor and a tool.

* * * * *